US011309815B2

(12) United States Patent
Garmendia Olarreaga et al.

(10) Patent No.: US 11,309,815 B2
(45) Date of Patent: Apr. 19, 2022

(54) CONTROL METHOD FOR OPERATING A SYNCHRONOUS MACHINE

(71) Applicant: INDAR ELECTRIC S.L., Beasain (ES)

(72) Inventors: Iker Garmendia Olarreaga, Ondarroa (ES); Alexander Galarraga Telleria, Azpeitia (ES); Nestor Campo Caballero, Donostia (ES)

(73) Assignee: INDAR ELECTRIC S.L., Beasain (ES)

( * ) Notice: Subject to any disclaimer, the term of this patent is extended or adjusted under 35 U.S.C. 154(b) by 0 days.

(21) Appl. No.: 17/274,017

(22) PCT Filed: Jul. 29, 2019

(86) PCT No.: PCT/EP2019/070369
§ 371 (c)(1),
(2) Date: Mar. 5, 2021

(87) PCT Pub. No.: WO2020/048683
PCT Pub. Date: Mar. 12, 2020

(65) Prior Publication Data
US 2021/0313914 A1  Oct. 7, 2021

(30) Foreign Application Priority Data
Sep. 6, 2018  (EP) ..................... 18382643

(51) Int. Cl.
*H02P 9/04* (2006.01)
*F02D 29/06* (2006.01)
(Continued)

(52) U.S. Cl.
CPC .............. *H02P 9/102* (2013.01); *H02P 9/006* (2013.01); *H02P 9/04* (2013.01); *H02P 9/105* (2013.01);
(Continued)

(58) Field of Classification Search
CPC .. H02P 9/006; H02P 9/04; H02P 9/102; H02P 9/105; H02P 2103/20; H02P 2205/05
See application file for complete search history.

(56) References Cited

U.S. PATENT DOCUMENTS 4,803,376 A * 2/1989 N'Guyen ................ F02N 11/04
290/22
6,262,904 B1 7/2001 Meynard et al.
(Continued)

FOREIGN PATENT DOCUMENTS

WO 2016/133503 A1 8/2016

OTHER PUBLICATIONS

European search report for EP 18382643.7 dated Mar. 7, 2019.
(Continued)

*Primary Examiner* — Tulsidas G Patel
*Assistant Examiner* — Thomas K Quigley
(74) *Attorney, Agent, or Firm* — Sughrue Mion, PLLC

(57) ABSTRACT

The invention related to a control method for operating a synchronous machine, the machine comprising an exciter connected to a synchronous generator and a controller (40) for controlling the machine field excitation. The method comprises the steps of predefining a stable operation torque derivative range within which a stable operation of the machine occurs, performing a torque measuring or calculating for the machine, calculating the derivative of said torque, determining whether the calculated torque derivative is within the predefined stable operation torque derivative range for the machine, and, if the torque derivative is not within the predefined stable operation torque derivative range, modifying the machine field excitation to bring the torque derivative within the predefined stable operation torque derivative range.

15 Claims, 1 Drawing Sheet

(51) Int. Cl.
*H02P 9/10* (2006.01)
*H02P 9/00* (2006.01)
*H02P 103/20* (2016.01)

(52) U.S. Cl.
CPC ...... *H02P 2103/20* (2015.01); *H02P 2205/05* (2013.01)

(56) References Cited

U.S. PATENT DOCUMENTS

| | | | |
|---|---|---|---|
| 6,982,533 B2 * | 1/2006 | Seibel | H02P 21/10 318/432 |
| 9,906,176 B2 | 2/2018 | Desabhatla | |
| 11,136,960 B2 * | 10/2021 | Monros Garrigosa | F03D 7/0272 |
| 2005/0057208 A1 * | 3/2005 | Seibel | H02P 21/10 318/432 |
| 2015/0035281 A1 * | 2/2015 | Lopez Rubio | F03D 7/0296 290/44 |
| 2015/0035501 A1 * | 2/2015 | Rozman | H02P 29/50 322/29 |
| 2015/0120116 A1 * | 4/2015 | Marsilia | B60L 15/2009 701/22 |
| 2021/0033065 A1 * | 2/2021 | Monros Garrigosa | H02P 9/006 |

OTHER PUBLICATIONS

Written opinion for PCT/EP2019/070369 dated Nov. 5, 2019.
International search report for PCT/EP2019/070369 dated Nov. 5, 2019.

* cited by examiner

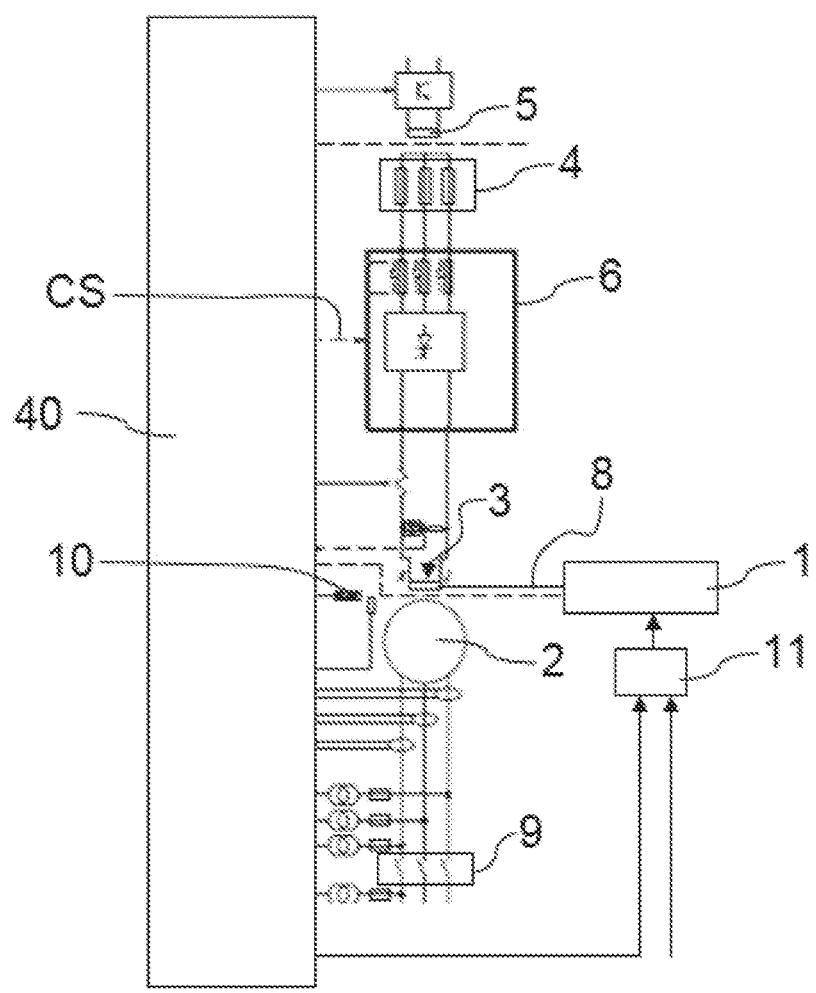

CONTROL METHOD FOR OPERATING A SYNCHRONOUS MACHINE

CROSS-REFERENCE TO RELATED APPLICATIONS

This application is a National Stage of International Application No. PCT/EP2019/070369 filed Jul. 29, 2019, which claims priority under U.S.C. § 119(a) to European Patent Application No. 18382643.7 filed on Sep. 6, 2018, the contents of which are incorporated by reference in their entirety.

FIELD OF THE INVENTION

The present invention relates to synchronous machines, and more particularly to a control method for controlling the synchronous machines during transients.

BACKGROUND OF THE INVENTION

Synchronous machines are rotating electromechanical machines that can be used as either motors or generators. Synchronous machines are commonly used as generators that are rotated by diesel machines for example, or other kind of prime movers such as steam, gas or hydraulic turbines, to supply a grid with electrical power.

Synchronous machines comprise then a generator with two mechanical parts, a rotating part (a rotor) and a stationary part (a stator), and an exciter comprising a stationary part and a rotating part. The stationary part of the exciter is supplied with a DC current which induces an alternating voltage in the rotating part of the exciter. The alternating voltage induced in the rotating part of the exciter is rectified by a power converter, and the generator rotor is supplied with this rectified voltage, which induces a DC current in the generator's rotor.

The DC current produces a magnetic field with magnetic flux that interacts with the armature winding, to induce an AC (alternating current) voltage in the armature winding. A field winding produces a magnetic field as a result of the DC current flowing through it.

When a synchronous machine operates as a generator, the generators rotor is rotated by a prime mover, such as a mechanical shaft driven by diesel machine or other kind of supply field such as a gas, steam or hydraulic turbine, and the field excitation in the rotor field winding by the DC field current rotates around the machine at the speed of rotation of the rotor by the prime mover, when the machine is synchronized (in stable operation zone of the machine). During transients, said synchronization may be lost, and the control over the machine can also be lost.

U.S. Pat. No. 9,906,176B2 discloses that the transient stability of a synchronous machine is largely defined by the operating point of the machine on its load angle curve, and proposes a control method taking this into account, not to lose the control over the machine during transients. Therefore, if the determined load angle is within the load angle curve, a stable situation is determined.

DISCLOSURE

The object of the invention is to provide a control method for operating a synchronous machine, as defined in the independent claim 1.

The machine comprises an exciter and a generator fixed by means of a main shaft, and the method comprises the following steps:
- predefining a stable operation torque derivative range within which a stable operation of the machine occurs,
- performing a torque measuring or calculating for the main shaft,
- calculating the derivative of said torque,
- determining whether the calculated torque derivative is within the predefined stable operation torque derivative range for the main shaft, and,
- if the torque derivative is not within the predefined stable operation torque derivative range, modifying the machine field excitation to bring the torque derivative within the predefined stable operation torque derivative range.

The variation or derivative of the torque of the machine when it is operating in stable condition is maintained constant or is changed in a controlled manner. Therefore, the evolution of the derivative torque can be known for a machine operating in a stable condition, and a stable operation torque derivative range within which a stable operation of the machine can, thus, be defined. Consequently, controlling the torque derivative of the machine can be used also for detecting not stable condition of the machine, such as damage of coupling between prime mover and generator, prime mover faults, grid faults or sudden load variations, for example, as a non-stable condition can also be detected even when no overcurrent is present (the case when the coupling between the prime mover and the generator is lost, situation in which the current comprises stable values).

By calculating the real torque derivative and determining if it is within the predefined stable operation torque derivative range or not, it can easily be determined then if the machine is operating in a stable condition. If it is not the case, the machine field excitation is modified trying to bring the machine into stable condition.

Hence, with the proposed solution an easy and quick way to operate the machine in non-stable conditions is achieved, in order to bring it to a stable condition.

BRIEF DESCRIPTION OF THE DRAWINGS

The FIGURE schematically shows a machine where an embodiment of the method of the disclosure is implemented.

DETAILED DESCRIPTION

The control method is adapted for operating a synchronous machine as the one shown in the FIGURE. A synchronous machine comprises a generator with two mechanical parts, a rotating part 3 (a rotor) and a stationary part 2 (a stator), and an exciter. The exciter comprises a rotating part 4, a stationary part 5 and a power converter 6, and said exciter is in charge of producing the machine field excitation a described before. The power converter 6 is connected between the exciter rotating part 4 and the generator rotating part 3.

The machine further comprises a controller 40, that fulfills at least the operations of a conventional automatic voltage regulator (AVR). The controller 40 is thus configured for controlling, at least, the machine field excitation of the machine, acting on the power converter 6. For that purpose, said controller 40 generates control signals CS for said power converter 6. The power converter 6 is, preferably, a thyristor power converter, said control signals CS controlling the state of the thyristors of the power converter 6.

The rotating part 3 of the generator is turned by an external prime mover 1, such as a mechanical shaft 8 driven a diesel machine. The prime mover 1 is governed by a prime mover governor 11 and said governor 11 generates a reference for the prime mover 1 according to plant requirements when the machine operates in stable conditions. The controller 40 is configured for controlling the power converter 6 in order to maintain the machine synchronized during said stable conditions.

The method comprises the following steps:
- predefining a stable operation torque derivative range within which a stable operation of the machine occurs,
- performing a torque measuring or calculating for the machine (preferably the torque is measured by means of a torque sensor or meter 10, but it could also be indirectly calculated, based on other measurements),
- calculating the derivative of said torque,
- determining whether the calculated torque derivative is within the predefined stable operation torque derivative range for the machine, and,
- if the torque derivative is not within the predefined stable operation torque derivative range, modifying the machine field excitation to bring the torque derivative within the predefined stable operation torque derivative range.

The torque is measured or calculated periodically (according to a predefine time cycle), the torque derivative being preferably calculated by comparing two consecutive torque measurement or calculation. In this manner, sudden changes of the torque can be rapidly detected, and the method can act quickly to bring the machine into stable condition. If the torque is calculated, known methods for doing it can be used.

The acceptable range for the torque derivative is preferably obtained from grid-codes requirements and from prime mover 1 requirements. Generally, the grid-code establishes the time response of the generator and the type of the prime mover 1 used limits the maximum and minimum torque for the generator. Therefore, considering the grid-code requirements and the type of prime mover 1 used the acceptable range for the torque derivative can be predefined.

The step of performing a torque measuring or calculating is performed by measuring or calculating the torque of the generator. As described before, preferably, the torque is measured using a torque sensor or meter 10.

The exciter rotating part 4 supply the power converter 6. The output of the power converter 6 is connected to the generator (to the rotating part 3 of the generator), said power converter 6 being controlled by control signals CS generated by the controller 40. The machine field excitation is modified depending on said control signals CS, therefore, if it is determined that the torque derivative is not within the predefined stable operation torque derivative range, the controller 40 itself adapts the control signals CS that act upon the power converter 6 accordingly, to modify the machine field excitation to bring the torque derivative within the predefined stable operation torque derivative range.

Preferably, upon detection that the torque derivative is not within the predefined stable operation torque derivative range and until said condition is overcome, the controller 40 generates a torque reference for the prime mover 1. The prime mover governor 11 is configured for attending the reference it receives according to plant requirements when the torque derivative is within the predefined stable operation torque derivative range, and to attend the torque reference generated by the controller 40 when the torque derivative is not within the predefined stable operation torque derivative range. Preferably, the prime mover governor 11 only receives the torque reference from the controller 40 when the torque derivative is not within the predefined stable operation torque derivative range, the prime mover governor 11 attending said torque reference and not the reference according to plant requirements, when it receives said torque reference. Therefore, the method generates the torque reference for the prime mover 1 when the machine is not operating in stable condition and adjusts its value while the torque derivative is moving along the torque derivative range, the return of the machine to the stable condition being facilitated and a securer control for the machine being offered the risk of losing the control of the machine being greatly reduced.

The machine also comprises a switching device for being connected to the grid, said switch device comprising, preferably, at least one generator circuit breaker 9. When the switching device is closed, the machine is connected to the grid, and when the switching device is opened, the machine is disconnected from the grid. The method further comprises the step of controlling the closure and aperture of the switching device by means of the controller 40 and said controller 40 is configured for causing the opening of the switching device in order to disconnect the machine from the grid, when the machine is going to be damaged. The machine can be damaged due to overcurrent, pole slip or other fault, and the controller 40 is configured for detecting at least one of said situations and for disconnecting the machine from the grid.

The invention claimed is:

1. A control method for operating a synchronous machine, the machine comprising an exciter connected to a synchronous generator and a controller for controlling a machine field excitation, the method comprising,
   - determining a torque for the machine,
   - calculating a derivative of said torque,
   - determining whether the calculated torque derivative is within a predefined stable operation torque derivative range for the machine, wherein the stable operation torque derivative range is a range within which a stable operation of the machine occurs, and
   - when the torque derivative is not within the predefined stable operation torque derivative range, modifying the machine field excitation to bring the torque derivative within the predefined stable operation torque derivative range.

2. The control method according to claim 1, wherein the torque is determined periodically, the torque derivative being calculated by comparing two torque determinations.

3. The control method according to claim 2, wherein the two torque determinations are two consecutive torque determinations.

4. The control method according to claim 1, wherein said determining the torque for the machine is determined by calculating a torque of the synchronous generator.

5. The control method according to claim 1, wherein said determining the torque for the machine is determined by measuring a torque of the synchronous generator.

6. The control method according to claim 5, wherein said measuring the torque of the synchronous generator is carried out by a torque sensor.

7. The control method according to claim 1, wherein the exciter comprises a rotating part and a stationary part, the exciter rotating part coupled to a power converter having an output which is connected to the synchronous generator, said power converter being controlled by control signals generated by the controller and the machine field excitation being modified by modifying said control signals.

8. The control method according to claim 7, wherein the synchronous generator of the machine comprises a rotating part and a stationary part, the output of the power converter being connected to the synchronous generator rotating part.

9. The control method according to claim 7, wherein the power converter comprises a thyristor power converter.

10. The control method according to claim 1, wherein the machine is couplable to a prime mover via a mechanical shaft, and upon determining that the torque derivative is not within the predefined stable operation torque derivative range, the controller generates a torque reference for the prime mover.

11. The control method according to claim 10, wherein the torque reference is sent to a prime mover governor, and the prime mover governor is configured to control the prime mover according to said torque reference.

12. The control method according to claim 1, wherein the machine further comprises a switching device configured to disconnect the machine from the grid, the controller causing the switching device to operate to disconnect the machine from the grid, upon determining that the machine is going to be damaged.

13. A controller for controlling a machine field excitation of a synchronous machine configured to supply power to a grid, the controller comprising:
   a control circuit;
   a control signal output configured to connect to a power converter of the synchronous machine; and
   a torque input configured to receive a torque signal indicating a torque of a synchronous generator of the synchronous machine,
   wherein the control circuit is configured to:
      determine a torque for the synchronous machine based on the received torque signal,
      calculate a derivative of said torque,
      determine whether the calculated torque derivative is within a predefined stable operation torque derivative range for the synchronous machine, wherein the stable operation torque derivative range is a range within which a stable operation of the synchronous machine occurs, and
   when the torque derivative is not within the predefined stable operation torque derivative range, output a control signal from the control signal output to modify the machine field excitation to bring the torque derivative within the predefined stable operation torque derivative range.

14. The controller according to claim 13, further comprising a torque reference signal output configured to output a torque reference signal to a control device for controlling a prime mover connected to the synchronous machine upon determining that the torque derivative is not within the predefined stable operation torque derivative range.

15. The controller according to claim 13, further comprising a switch output configured for connection to a switching device configured to disconnect the synchronous machine from the grid, the controller outputting a disconnect signal to the switch output to cause the switching device to operate to disconnect the machine from the grid, upon determining that the synchronous machine is going to be damaged.

* * * * *